(12) United States Patent
Yang et al.

(10) Patent No.: US 12,439,730 B2
(45) Date of Patent: Oct. 7, 2025

(54) SOLAR CELLS

(71) Applicant: Trina Solar Co., Ltd, Changzhou (CN)

(72) Inventors: Guangtao Yang, Changzhou (CN); Daming Chen, Changzhou (CN); Yifeng Chen, Changzhou (CN)

(73) Assignee: Trina Solar Co., Ltd, Changzhou (CN)

( * ) Notice: Subject to any disclaimer, the term of this patent is extended or adjusted under 35 U.S.C. 154(b) by 98 days.

(21) Appl. No.: 18/501,236

(22) Filed: Nov. 3, 2023

(65) Prior Publication Data
US 2024/0379882 A1   Nov. 14, 2024

(30) Foreign Application Priority Data
May 9, 2023 (CN) .......................... 202310512207.6

(51) Int. Cl.
 *H10F 77/30* (2025.01)
 *H10F 10/14* (2025.01)
 *H10F 77/20* (2025.01)

(52) U.S. Cl.
 CPC ......... *H10F 77/311* (2025.01); *H10F 10/146* (2025.01); *H10F 77/211* (2025.01); *H10F 77/244* (2025.01); *H10F 77/315* (2025.01)

(58) Field of Classification Search
 CPC .... H10F 77/311; H10F 77/244; H10F 10/146; H10F 77/315; H10F 77/211
 See application file for complete search history.

(56) References Cited

U.S. PATENT DOCUMENTS

| 2013/0247965 A1 | 9/2013 | Swanson et al. |
| 2017/0222072 A1 | 8/2017 | Rim et al. |
| (Continued) | | |

FOREIGN PATENT DOCUMENTS

| CN | 115000189 | 9/2022 |
| CN | 115513307 | 12/2022 |
| (Continued) | | |

OTHER PUBLICATIONS

Office Action (English Translation) mailed Jun. 12, 2023 in corresponding Chinese Patent Application No. 202310512207.6, 6 pages.
(Continued)

*Primary Examiner* — Tae-Sik Kang
(74) *Attorney, Agent, or Firm* — HOVEY WILLIAMS LLP (57) ABSTRACT

A solar cell comprises a substrate having an opposite first surface and a second surface, and the second surface has a first regions and a second regions adjacent in the first direction; a first passivation layer located on the first surface; a first doped layer and a tunnel oxide layer sequentially stacked in the first region; a first insulating layer located on a surface of the first doped layer away from the substrate; a second passivation layer located in the second region and extending to a surface of the first insulating layer away from the substrate; a second doped layer located on a surface of the second passivation layer away from the substrate, and a second insulating layer located between the second passivation layer and the first doped layer, the tunnel oxide layer in the first direction, a surface of the second insulating layer away from the substrate contacting with the first insulating layer.

10 Claims, 9 Drawing Sheets

(56) References Cited

U.S. PATENT DOCUMENTS

2021/0091249 A1* 3/2021 Smith .................. H10F 77/707
2023/0006076 A1* 1/2023 Xu ......................... H10F 10/16

FOREIGN PATENT DOCUMENTS

| CN | 115513308 | 12/2022 |
| CN | 115513309 | 12/2022 |
| CN | 115548155 | 12/2022 |
| CN | 115810688 | 3/2023 |

OTHER PUBLICATIONS

Office Action (Chinese Language) mailed Jun. 12, 2023 in corresponding Chinese Patent Application No. 202310512207.6, 6 pages.
Office Action mailed Oct. 16, 2024 in corresponding European Patent Application No. 23214307.3, 17 pages.
Machine Translation of CN115548155, 7 pages.
Office Action mailed Dec. 23, 2024 in corresponding Australian Patent Application No. 2023278024, 6 pages.
Machine Translation of CN115810688, 10 pages.
Notice of Allowance (English translation) mailed Jun. 30, 2023 in corresponding Chinese Patent Application No. 202310512207.6, 4 pages.
Notice of Allowance (Chinese language) mailed Jun. 30, 2023 in corresponding Chinese Patent Application No. 202310512207.6, 4 pages.
Machine Translation of CN115513308, 16 pages.
Machine Translation of CN115000189, 10 pages.
Machine Translation of CN115513309, 14 pages.
Machine Translation of CN115513307, 14 pages.

* cited by examiner

SOLAR CELLS

CROSS-REFERENCE TO RELATED APPLICATION

The present U.S. non-provisional patent application claims priority to Chinese Patent Application No. 202310512207.6, filed on May 9, 2023, and entitled "SOLAR CELLS." The entirety of the above-identified Chinese patent application is hereby incorporated by reference into the present U.S. non-provisional application.

TECHNICAL FIELD

The present application mainly relates to the field of photovoltaic technology, and specifically to a solar cell.

BACKGROUND

With the development of solar cell technology, more and more types of solar cells have been developed. At present, the types of solar cells mainly include Passivated Emitter Rear Cell (PERC), Tunnel Oxide Passivated Contact Cell (TOPCON), Hetero-Junction with Intrinsic Thin Film Cell (HIT), and Interdigitated Back Contact Cell (IBC), and so on. Although with the development of solar cell technology, the photoelectric conversion efficiency of solar cells has gradually increased, but the pursuit of higher photoelectric conversion efficiency will never stop.

BRIEF SUMMARY

In one embodiment, the solar cell comprises a substrate having a first surface and a second surface opposite to each other, and the second surface has a first region and a second region adjacent in a first direction; a first passivation layer located on the first surface; a first doped layer and a tunnel oxide layer sequentially stacked in the first region; a first insulating layer located on a surface of the first doped layer away from the substrate; a second passivation layer located in the second region and extending to a surface of the first insulating layer away from the substrate; a second doped layer located on a surface of the second passivation layer away from the substrate, and a second insulating layer located between the second passivation layer and the first doped layer, and between the second passivation layer and the tunnel oxide layer in the first direction, a surface of the second insulating layer away from the substrate contacting with the first insulating layer.

BRIEF DESCRIPTION OF THE DRAWINGS

In order to make the features and advantages of the present application more obvious and understandable, the specific implementation methods of the present application will be described in detail below in conjunction with the drawings, wherein.

DETAILED DESCRIPTION

In order to make the above objects, features and advantages of the present application more comprehensible, the specific implementation manners of the present application will be described in detail below in conjunction with the accompanying drawings.

Many specific details are set forth in the following description to facilitate a full understanding of the present application, but the present application can also be implemented in other ways than those described here, so the present application is not limited by the specific embodiments disclosed below.

As indicated in this application and claims, the terms "a", "an", "an" and/or "the" do not refer to the singular and may include the plural unless the context clearly indicates an exception. Generally speaking, the terms "comprising" and "comprising" only suggest the inclusion of clearly identified steps and elements, and these steps and elements do not constitute an exclusive list, and the method or device may also contain other steps or elements.

In addition, it should be noted that the use of words such as "first" and "second" to define components is only for the convenience of distinguishing corresponding components. To limit the protection scope of this application. In addition, although the terms used in this application are selected from well-known and commonly used terms, some terms mentioned in the specification of this application may be selected by the applicant according to his or her judgment, and their detailed meanings are listed in this article described in the relevant section of the description. Furthermore, it is required that this application be understood not only by the actual terms used, but also by the meaning implied by each term.

The flow chart is used in this application to illustrate the operations performed by the system according to the embodiment of this application. The preceding or following operations are not necessarily performed in an exact order. Instead, various steps may be processed in reverse order or concurrently. At the same time, other operations are either added to these procedures, or a certain step or steps are removed from these procedures.

The solar cell of the present application will be described through specific examples.

Figure 1A:
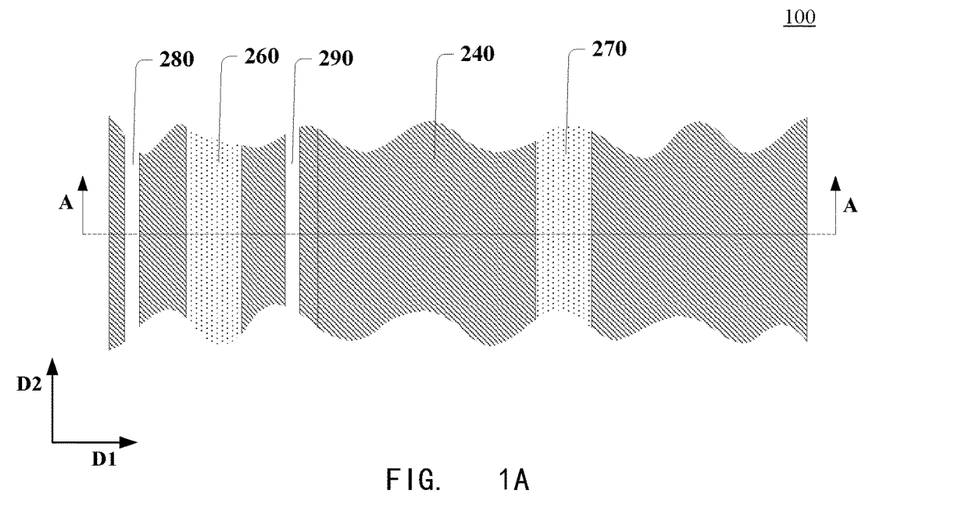
FIG. 1A is a schematic partial top view of a solar cell according to an embodiment of the present application.
Figure 1B:
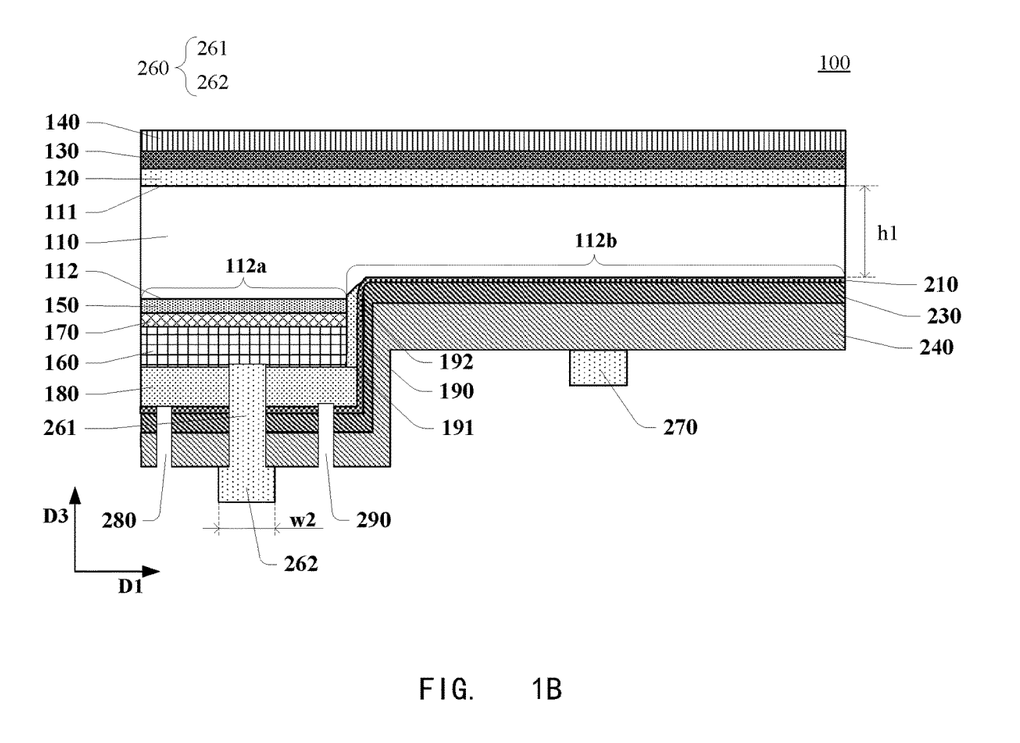
FIG. 1B is a schematic cross-sectional view of the solar cell along line A-A in FIG. 1A.

FIG. 1A is a schematic partial top view of a solar cell 100 according to an embodiment, and FIG. 1B is a schematic cross-sectional view of solar cell 100 along line A-A in FIG. 1A. It should be noted that what is shown in FIG. 1A and FIG. 1B is not the view of the entire solar cell, but the partial features of the entire solar cell. For the convenience of description, the structure shown in FIG. 1A and FIG. 1B is referred to as a partial solar cell, and this description is also applicable to the drawings showing the partial structure of the entire solar cell in the following.

Referring to FIG. 1A and FIG. 1B, the partial solar cell 100 is in the shape of a sheet, which is in a plane defined by a first direction D1 and a second direction D2, and has a certain thickness in a thickness direction D3. The entire solar cell includes several partial solar cells 100 each shown in FIG. 1B and the several partial solar cells 100 are adjacently arranged in the first direction D1.

Referring to FIG. 1B, the substrate 110 in the partial solar cell 100 may be single crystal silicon (c-Si). The substrate 110 may be doped, and the doped substrate 110 may be a n-type single crystal silicon, the doped substrate 110 may also be a p-type single crystal silicon. When the substrate 110 is the n-type single crystal silicon, the doping element may be phosphorus (P) and/or arsenic (As); when the substrate 110 is the p-type single crystal silicon, the doping element may be boron (B) and/or gallium (Ga). The present application does not limit the doping method and the doping concentration of the substrate 110.

The silicon substrate 110 has a thickness h1 in the thickness direction D3, 60 µm≤h1≤250 µm. The substrate 110 has a first surface 111 and a second surface 112 opposite to each other in the thickness direction D3. When the partial solar cell 100 is working, the first surface 111 serves as a light-receiving surface to receive light to generate electric energy. As shown in FIG. 1B, the first diffusion layer 120 is formed on the first surface 111. The first diffusion layer 120 may be crystalline silicon (single crystal silicon and/or polycrystalline silicon), and the doping type of the first diffusion layer 120 may be the same as or different from that of the substrate 110. The doping concentration of the first diffusion layer 120 is equal to or greater than that of the substrate 110.

The first diffusion layer 120 has a certain thickness in the thickness direction D3, and this application does not limit the thickness of the first diffusion layer 120. In the embodiment of FIG. 1B, the diffusion depth of the dopant element in the first diffusion layer 120 is equal to or greater than 10 nm and equal to or less than 1500 nm. For example, the diffusion depth can be any of the following depths, 10 nm, 100 nm, 200 nm, 300 nm, 400 nm, 500 nm, 600 nm, 700 nm, 800 nm, 900 nm, 1000 nm, 1100 nm, 1200 nm, 1300 nm, 1400 nm, and 1500 nm.

The first passivation layer 130 and the anti-reflection layer 140 in the partial solar cell 100 are sequentially stacked on the surface of the first diffusion layer 120 away from the substrate 110 in the thickness direction D3. The material of the first passivation layer 130 may be selected from one or more of intrinsic amorphous silicon, silicon oxide ($SiO_2$), silicon oxynitride ($SiO_xN_y$), aluminum oxide ($Al_2O_3$), and a composite layer of intrinsic amorphous silicon and doped thin film silicon, wherein, intrinsic amorphous silicon may include one or more elements of oxygen (O), carbon (C), nitrogen (N); doping thin film silicon can be doped with phosphorus (P) or boron (B), and the doped thin-film silicon can contain one or more of oxygen (O), carbon (C), and nitrogen (N). In some embodiments, when material of the first passivation layer 130 is selected from the above-mentioned multiple materials, the first passivation layer 130 may be a stacked structure formed of the above-mentioned multiple materials. For example, the stacked structure may be a stack of a layer of aluminum oxide and a layer of silicon oxynitride, or a stack of a layer of aluminum oxide and a layer of silicon oxide. The first passivation layer 130 having a stacked structure has a stacked passivation effect.

According to different passivation mechanisms, the first passivation layer 130 may be a chemical passivation layer or a field passivation layer, or may be formed by stacking a chemical passivation layer and a field passivation layer. When the first passivation layer 130 is formed by stacking the chemical passivation layer and the field passivation layer, the chemical passivation layer is located on the side of the first diffusion layer 120 away from the substrate 110 in the thickness direction D3, and the field passivation layer is located on the side of the chemical passivation layer away from the substrate 110 in the thickness direction D3. Moreover, the anti-reflection layer 140 is located on the side of the field passivation layer away from the substrate 110. The chemical passivation layer can saturate the defects on the first surface 111 of the substrate 110 and reduce the concentration of defects, thereby reducing the recombination center in the forbidden band, thereby improving the efficiency of the solar cell. The field passivation layer can form an electrostatic field at the interface through charge accumulation, thereby reducing the concentration of minority carriers and improving the efficiency of solar cells.

In one embodiment, the thickness of the first passivation layer 130 in the thickness direction D3 is equal to or greater than 1.5 nm. The thickness of the anti-reflection layer 140 in the thickness direction D3 is equal to or greater than 40 nm. Forming the anti-reflection layer 140 on the side where the first surface 111 locates can increase the absorption of incident light by the solar cell, thereby improving the utilization rate of the incident light by the solar cell. The anti-reflection layer 140 can be silicon oxide and/or silicon oxynitride. In some embodiments, the first surface 111 has a pyramid-textured topography. The first diffusion layer 120, the first passivation layer 130, and the anti-reflection layer 140 sequentially formed on the first surface 111 also have a pyramidal texture. When the solar cell is working, the pyramid texture can trap light and reduce the reflection of incident light, thereby improving the light utilization rate of the solar cell.

In some embodiments, the partial solar cell 100 may not have the first diffusion layer 120, and the first passivation layer 130 is formed on the first surface 111 of the substrate 110. Continuing to refer to FIG. 1B, the second surface 112 includes a first region 112a and a second region 112b adjacent in the first direction D1. In some embodiments, the second surface 112 has a pyramid texture which can be formed by etching the second surface 112 with an alkaline reagent. In some other embodiments, the second surface 112 is a chemically polished surface.

The second diffusion layer 150 is formed in the first region 112a. The second diffusion layer 150 may be crystalline silicon (single crystal silicon and/or polycrystalline silicon), and the doping type of the second diffusion layer 150 is the same as or opposite to that of the substrate 110. This application does not limit the doping concentration of the second diffusion layer 150. The doping concentration of the second diffusion layer 150 can be equal to or less than the doping concentration of the first doping layer 160; the doping concentration of the first diffusion layer 120 can also be equal to or greater than the doping concentration of the second diffusion layer 150; the doping concentration of the diffusion layer 120 may also be greater than that of the substrate 110.

The second diffusion layer 150 has a certain thickness in the thickness direction D3. The diffusion depth of the dopant element in the second diffusion layer 150 is equal to or greater than 10 nm and equal to or less than 1500 nm.

A tunnel oxide layer 170 and a first doped layer 160 are sequentially formed on a side of the second diffusion layer 150 away from the substrate 110. The material of the tunnel oxide layer 170 may be selected from one or more of silicon oxide, silicon oxynitride and aluminum oxide. In some embodiments, the tunnel oxide layer 170 contains doping elements in the substrate 110 and/or the first doped layer 160. The thickness of the tunnel oxide layer 170 in the thickness direction D3 is equal to or less than 3 nm.

The first doped layer 160 may be doped polysilicon, the doped polysilicon may contain one or more of oxygen, carbon, and nitrogen, and the doping type of the first doped layer 160 may be the same as that of the substrate 110, which may also be opposite to the substrate 110. In some embodiments, the thickness of the first doped layer 160 in the thickness direction D3 is equal to or greater than 20 nm and equal to or less than 600 nm. The structure formed by the combination of the tunnel oxide layer 170 and the first doped layer 160 can realize the selective collection of carriers, reduce the recombination of carriers, and play an important role in surface passivation.

In some embodiments, the second diffusion layer 150 may be formed by diffusing dopant elements in the first doped layer 160 into the substrate 110 during the step of forming the first doped layer 160.

In FIG. 1B, a first insulating layer 180 is located on a side of the first doped layer 160 facing away from the substrate 110. The first insulating layer 180 may be selected from one or more of silicon oxide, silicon nitride, and silicon oxynitride. The first insulating layer 180 may contain the doping elements in the first doped layer 160, and these doping elements in the first insulating layer 180 may be intentionally doped through a specific process or may be from the self-diffusion of the doping elements in the first doped layer 160. For example, the doping elements in the first doping layer 160 enter the part of the first insulating layer 180 away from the substrate 110 through self-diffusion.

In some embodiments, the partial solar cell 100 may not have the second diffusion layer 150, and the tunnel oxide layer 170 is formed in the first region 112a of the second surface 112.

As shown in FIG. 1B, the second diffusion layer 150, the tunnel oxide layer 170 and the first doped layer 160 are sequentially stacked in the first region 112a in the thickness direction D3. Compared FIG. 1G with FIG. 1B, part of the structure in FIG. 1B is removed in FIG. 1G. The stack structure formed by stacking the second diffusion layer 150, the tunnel oxide layer 170 and the first doped layer 160 is called a first stack structure 340. The first stack structure 340 has a first surface 341 and a second surface 342. The first surface 341 includes the surface of the second diffusion layer 150 located on its right side in the first direction D1, the surface of the tunnel oxide layer 170 located on its right side in the first direction D1, and the surface of the first doped layer 160 located on its right side in the first direction D1. And the second surface 342 is the surface of the first doped layer 160 away from the substrate 110. In some embodiments, the first stack structure 340 may not include the second diffusion layer 150. In this case, the tunnel oxide layer 170 and the first doped layer 160 are sequentially stacked in the first region 112a in the thickness direction D3.

Figure 1C:
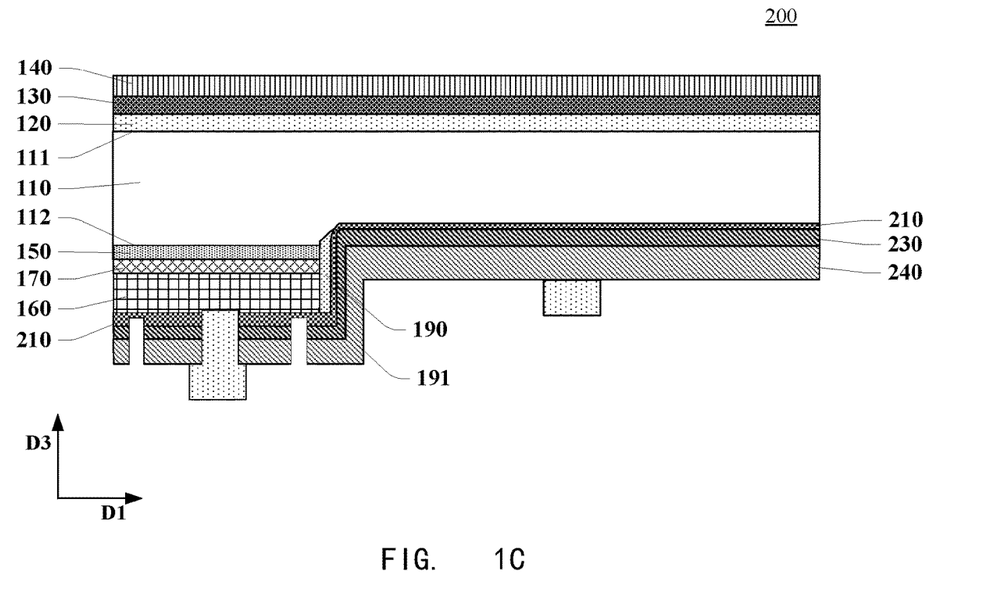
FIGS. 1C to 1J are partial cross-sectional schematic diagrams of solar cells according to different embodiments of the present application.
Figure 1D:
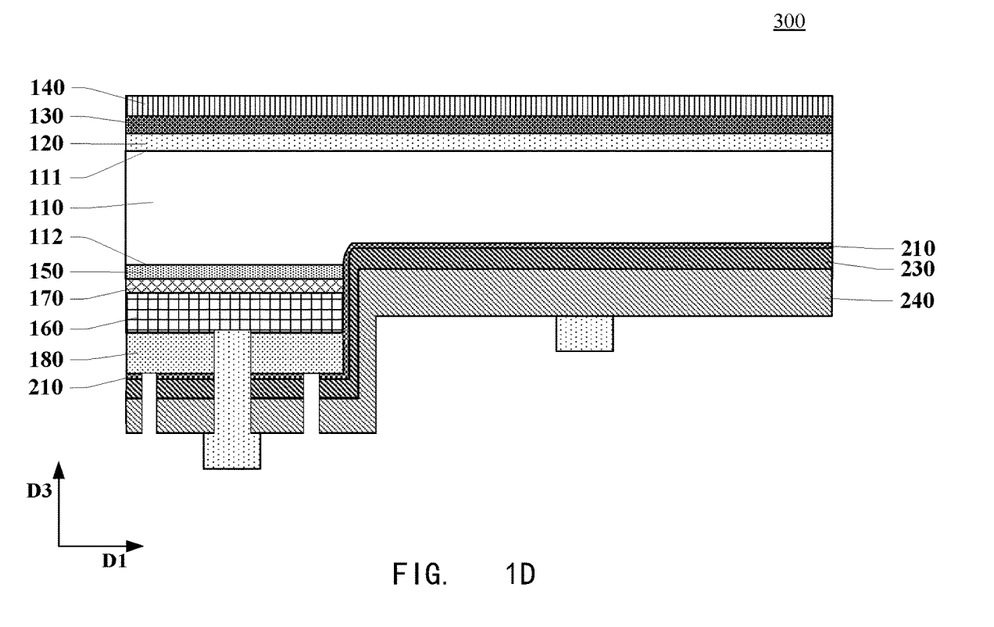
Figure 1E:
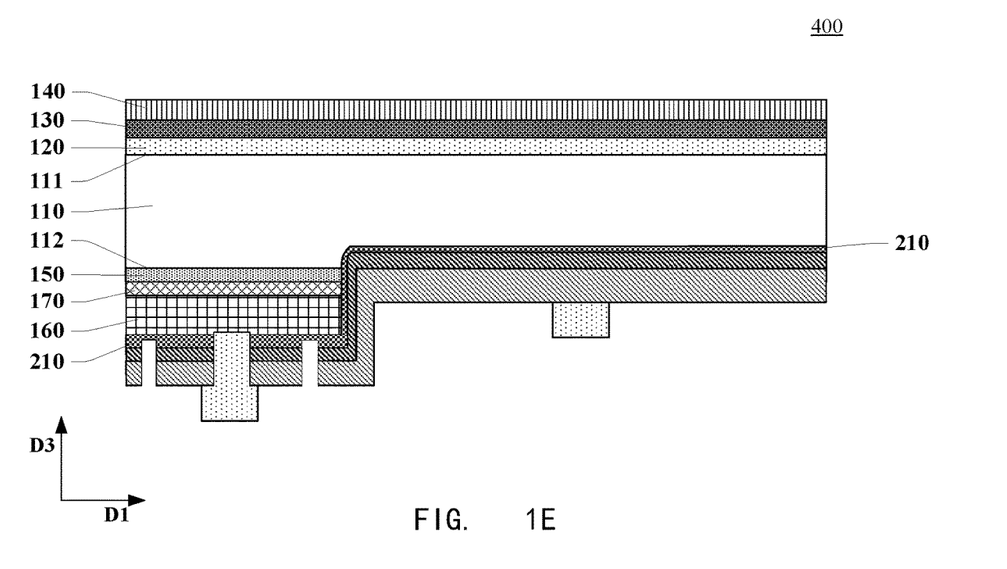
Figure 1F:
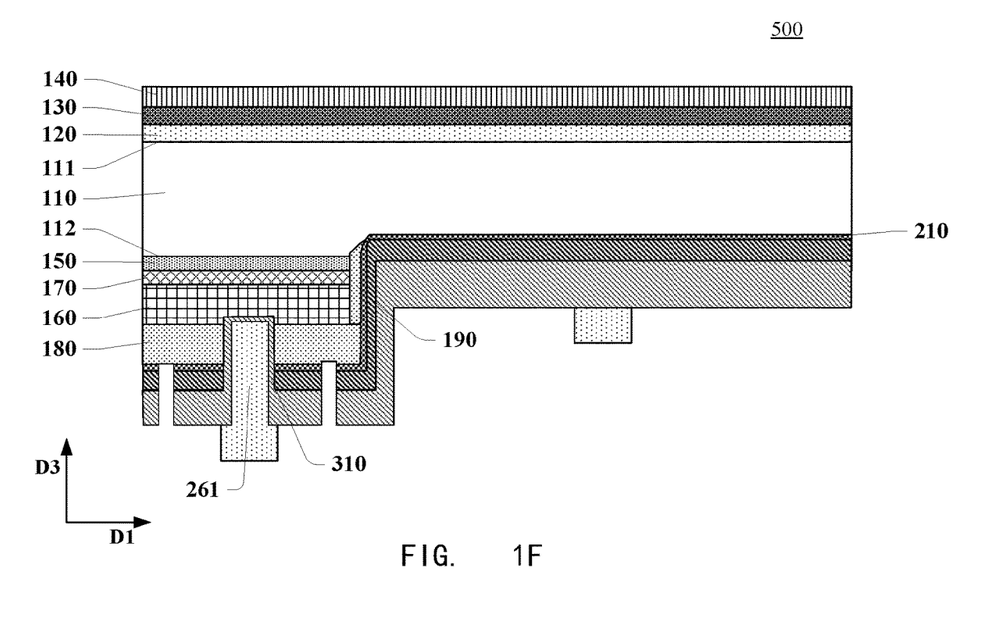
Figure 1G:
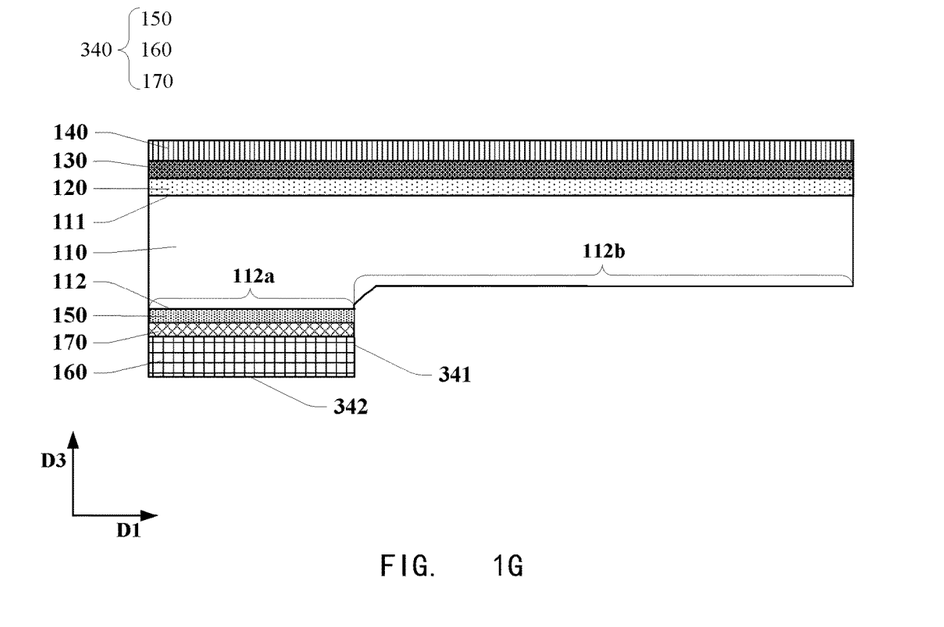

Referring FIG. 1B and FIG. 1G concurrently, the partial solar cell 100 further includes a second insulating layer 190. The second insulating layer 190 has two opposite sides in the first direction D1 with one side in contact with the first surface 341 of the first stack structure 340 and the other side in contact with the second passivation layer 210. In other words, the second insulating layer 190 is located between the second passivation layer 210 and the first stack structure 340 in the first direction D1. Further, the side surface 191 of the second insulating layer 190 is in contact with the first insulating layer 180. The material of the second insulating layer 190 may be the same as or different from that of the first insulating layer 180. In some embodiments, the first insulating layer 180 and the second insulating layer 190 can be formed through the same process step, in which the first insulating layer 180 is formed on the second surface 342 of the first stacked structure 340, and the second insulating layer 190 is formed on the first surface 341 of the first stack structure 340.

The first insulating layer 180 is arranged between the first stack structure 340 and the second passivation layer 210 in the thickness direction D3, and the second insulating layer 190 is arranged between the first stack structure 340 and the second passivation layer 210 in the first direction D1. In this way, the first insulating layer 180 and the second insulating layer 190 electrically isolate the first stacked structure 340 from the second passivation layer 210, thereby avoiding a short circuit between two adjacent electrodes of the partial solar cell 100. In some embodiments, the thicknesses of the first insulating layer 180 and the second insulating layer 190 are equal to or greater than 1.5 nm respectively. The thicknesses of the first insulating layer 180 and the second insulating layer 190 may be equal or unequal. For example, in FIG. 1B, the thickness of the first insulating layer 180 is greater than the thickness of the second insulating layer 190. The reasons for this thickness relationship include: when the first insulating layer 180 and the second insulating layer 190 are formed through the same process, the slope of the plane where the second insulating layer 190 is located is greater than the slope of the plane where the first insulating layer 180 is located; the roughness of the plane where the insulating layer 190 is located is different from the roughness of the plane where the first insulating layer 180 is located.

In FIG. 1B, the second insulating layer 190 has a tail portion 192 whose thickness gradually decreases in the thickness direction D3. In some embodiments, the second insulating layer formed in the second region 112b needs to be removed during the production process, and the tail portion 192 is formed during the removal of the second insulating layer 190.

In some embodiments, the first insulating layer 180 and/or the second insulating layer 190 may also be removed from FIG. 1B, which is described below. FIG. 1C, FIG. 1D and FIG. 1E are schematic cross-sectional views of partial solar cell 200, partial solar cell 300, and partial solar cell 400 in different embodiments, respectively. Referring to FIG. 1C, different from the partial solar cell 100 in FIG. 1B, the partial solar cell 200 in FIG. 1C does not include the first insulating layer 180, and the second passivation layer 210 in the first region 112a formed on the side of the first doped layer 160 away from the substrate 110. It should be noted that, even if the contact between the second passivation layer 210 and the first doped layer 160 will cause a short-circuit between the adjacent two electrodes of the partial solar cell 200, the current density of the short-circuit is very small, and the effect on the efficiency of the partial solar cell 200 is small or neglectable.

Referring FIG. 1D and FIG. 1G, different from the partial solar cell 100 in FIG. 1B, the partial solar cell 300 in FIG. 1D does not include the second insulating layer 190 in FIG. 1B and the second passivation layer 210 is in contact with the first surface 341 of the first stack structure 340. It should be noted that, like FIG. 1C, even if the contact between the second passivation layer 210 and the first doped layer 160 may cause a short-circuit between two adjacent electrodes of the partial solar cell 300, the current density of the short-circuit is very small, and the effect of the efficiency of the partial solar cell 300 is small or neglectable.

Referring FIG. 1E and FIG. 1G, different from the partial solar cell 100 in FIG. 1B, the partial solar cell 400 in FIG. 1E does not include the first insulating layer 180 and the second insulating layer 190 in FIG. 1B, and the second passivation layer 210 corresponding to the first region 112*a* is formed on the surface of the first doped layer 160 away from the substrate 110, and the second passivation layer 210 is in contact with the first surface 341 of the first stack structure 340. It should be noted that, like FIG. 1B and FIG. 1C, even if the contact between the second passivation layer 210 and the first doped layer 160 will cause a short-circuit between the adjacent electrodes of the partial solar cell 400, the current density of the short-circuit is very small, and the effect of the efficiency of the partial solar cell 400 is small or neglectable.

Figure 2A:
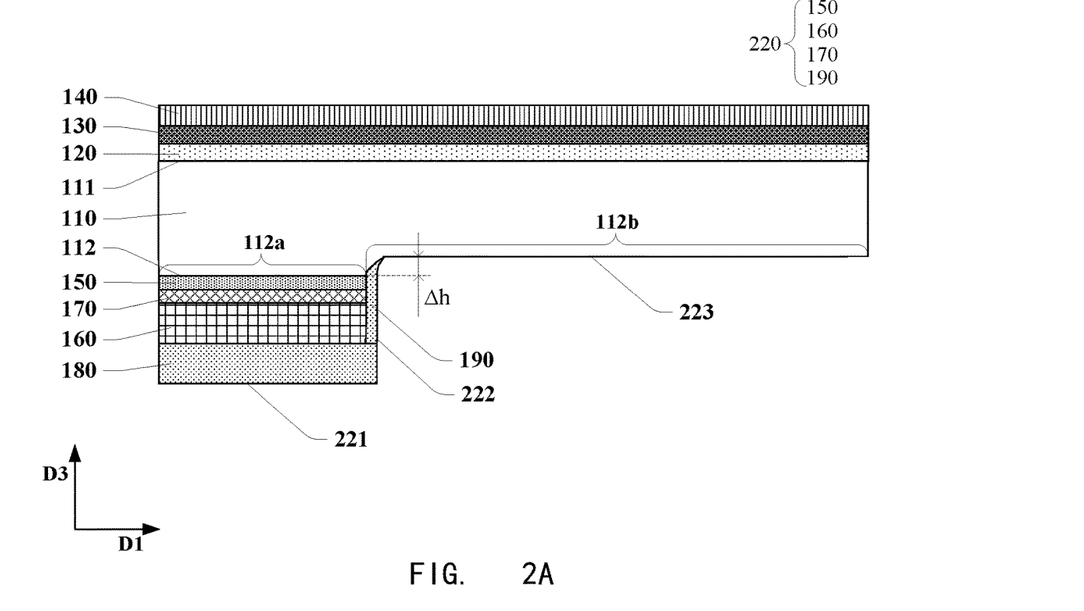
FIGS. 2A to 2E are partial cross-sectional schematic diagrams of solar cell intermediates according to different embodiments of the present application.

FIG. 2A is a schematic cross-sectional view of a solar cell intermediate during the production process according to an embodiment. What is shown in FIG. 2A may be an intermediate for producing the partial solar cell in FIG. 1A. The intermediate shown in FIG. 2A is not a cross-sectional view of an entire solar cell, but a partial cross-sectional view of an entire solar cell.

Referring to FIG. 2A, the second diffusion layer 150, the tunnel oxide layer 170, the first doped layer 160 and the first insulating layer 180 are sequentially stacked in the first region 112*a* in the thickness direction D3. The second insulating layer 190 is formed on the side surfaces of the second diffusion layer 150, the tunnel oxide layer 170 and the first doped layer 160. For the convenience of description, the second insulating layer 190, the sequentially stacked second diffusion layer 150, the tunnel oxide layer 170, the first doped layer 160 and first insulating layer 180 are collectively referred to as the second stack structure 220. As shown in FIG. 2A, the second stack structure 220 is in the first region 112*a* and is adjacent to the second region 112*b* in the first direction D1. The substrate 110 at the second region 112*b* and the second stack structure 220 form a step structure with a height difference in the thickness direction D3. As shown in FIG. 2A, the step structure has a first surface 221, a second surface 222, and a third surface 223. Here, the first surface 221 is away from the substrate 110 in the thickness direction D3, and the second surface 222 includes a surface on the right side of the first insulating layer 180 in the first direction D1 and a surface on the right side of the second insulating layer 190 in the first direction D1.

As shown in FIG. 1B and FIG. 2A, the second passivation layer 210 is formed on the first surface 221, the second surface 222 and the third surface 223. The second passivation layer 210 may be intrinsic amorphous silicon, and the intrinsic amorphous silicon may contain one or more of oxygen, carbon, and nitrogen elements. These elements help to improve the performance of the second passivation layer 210 and reduce the optical absorption loss at the same time. The thickness of the second passivation layer 210 may be any thickness in the range of 3 nm to 15 nm. It should be noted that the thicknesses of the second passivation layer 210 may be equal or unequal in areas where the second passivation layer 210 is in contact with the first surface 221, the second surface 222 and the third surface 223 respectively.

As shown in FIG. 2A, there is a height difference Δh between the first region 112*a* and the second region 112*b* in the thickness direction D3. The height difference Δh can be produced by a certain process step in the solar cell production process. For example, when using an etching process to remove the second diffusion layer 150 at the second region 112*b*, the etching process etches the substrate 110 at the second region 112*b* in the thickness direction D3, so that the height difference Δh is created between the first region 112*a* and the second region 112*b*. The height difference Δh helps to avoid short-circuits between the two electrodes of the solar cell. The height difference Δh can be any value from 0.2 μm to 20 μm, for example, 0.2 μm, 10 μm, 15 μm or 20 μm. In other embodiments, the second surface 112 is a flat surface, that is, there is no height difference or no obvious height difference between the first region 112*a* and the second region 112*b* in the thickness direction D3.

Figure 1H:
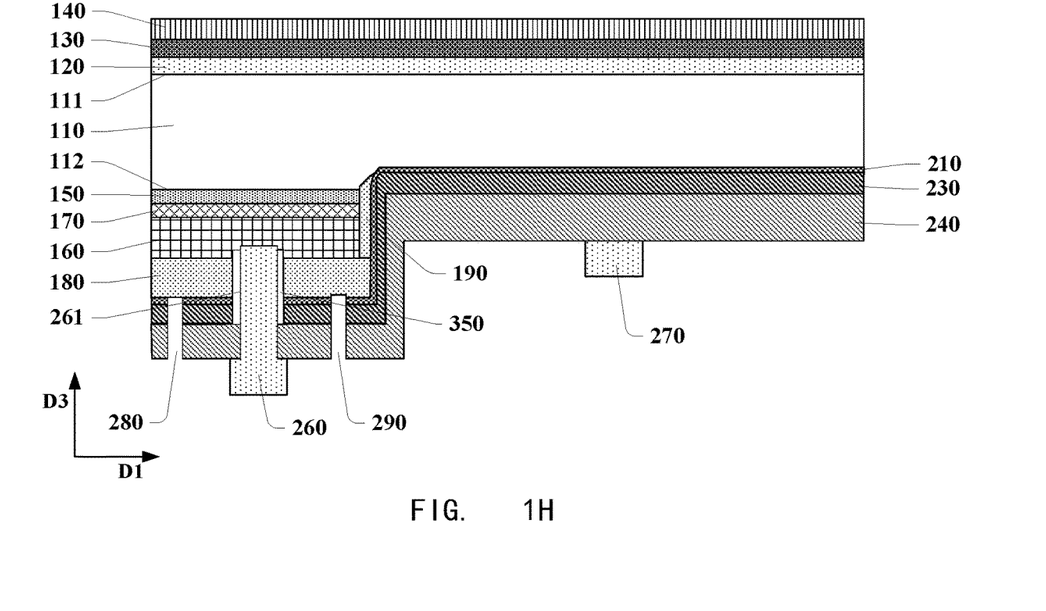
Figure 1I:
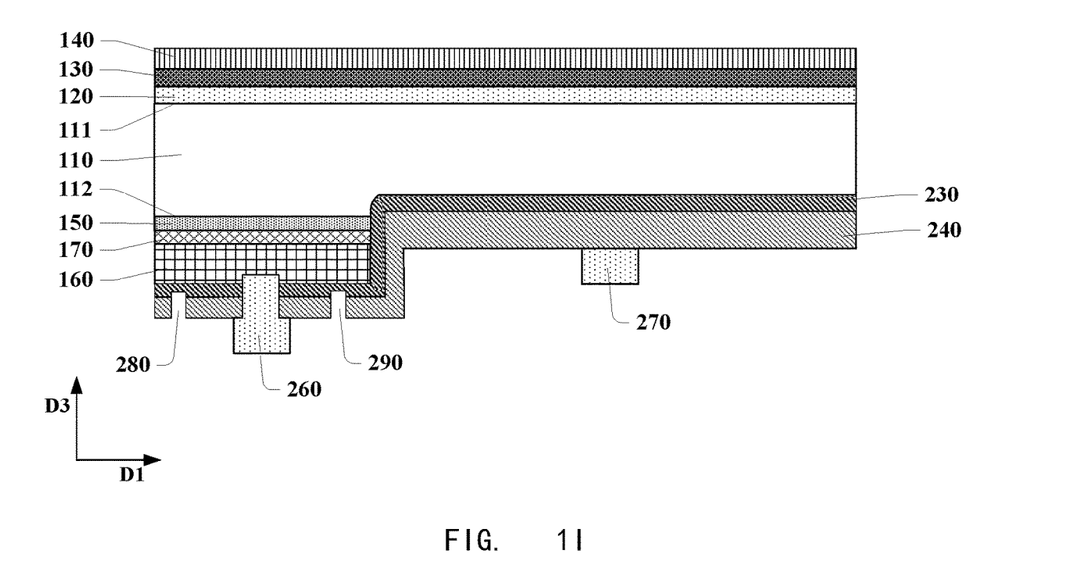
Figure 1J:
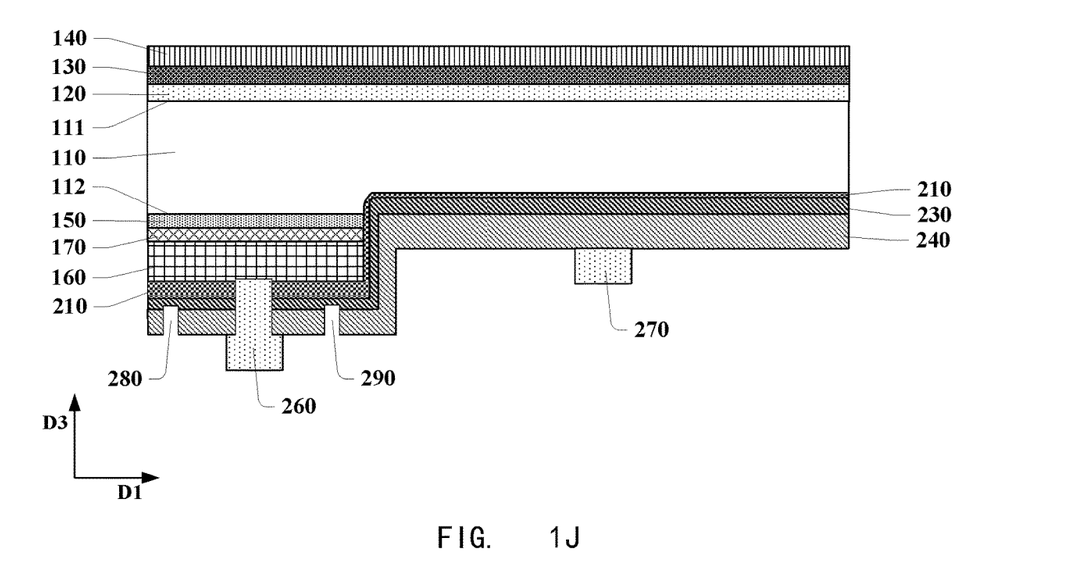

Referring to FIG. 1G and FIG. 1I, the second doped layer 230 and the first transparent conductive layer 240 are sequentially stacked in the second region 112*b*, and both extend to the second surface 342 of the first stacked structure 340. Referring to FIG. 1G and FIG. 1J, in other embodiments, the second passivation layer 210, the second doped layer 230 and the first transparent conductive layer 240 are sequentially stacked in the second region 112*b*, and all extend to the second surface 342 of the first stacked structure 340.

Returning to FIG. 1B, the second doped layer 230 and the first transparent conductive layer 240 are sequentially formed on the surface of the second passivation layer 210 away from the substrate 110 in the thickness direction D3 and the surface of the second passivation layer 210 away from the second stack structure 220 in the first direction D1. In other words, as shown in FIG. 2A, the second passivation layer 210, the second doped layer 230 and the first transparent conductive layer 240 are sequentially stacked on the first surface 221, the second surface 222 and the third surface 223 of the step structure. The second doped layer 230 may be doped amorphous silicon and/or microcrystalline silicon, and the doped crystalline silicon and microcrystalline silicon may include one or more of oxygen, carbon, and nitrogen. The thickness of the second doped layer 230 may be any value in the range of 3 nm to 60 nm. The material of the first transparent conductive layer 240 may be selected from one or more of zinc oxide (ZnO), indium oxide (InO), and tin oxide (SnO). The first transparent conductive layer 240 may be doped with one or more of gallium (Ga), tin (Sn), molybdenum (Mo), cerium (Ce), fluorine (F), tungsten (W), and aluminum (Al). The thickness of the first transparent conductive layer 240 is equal to or greater than 10 nm and equal to or less than 200 nm.

Referring to FIG. 1B and FIG. 2A, the thickness of portions of the second passivation layer 210 corresponding to the first surface 221, the second surface 222 and the third surface 223 of the step structure may be equal or not equal. The second doped layer 230 and the first transparent conductive layer 240 have the same characteristics mentioned above.

Figure 2B:
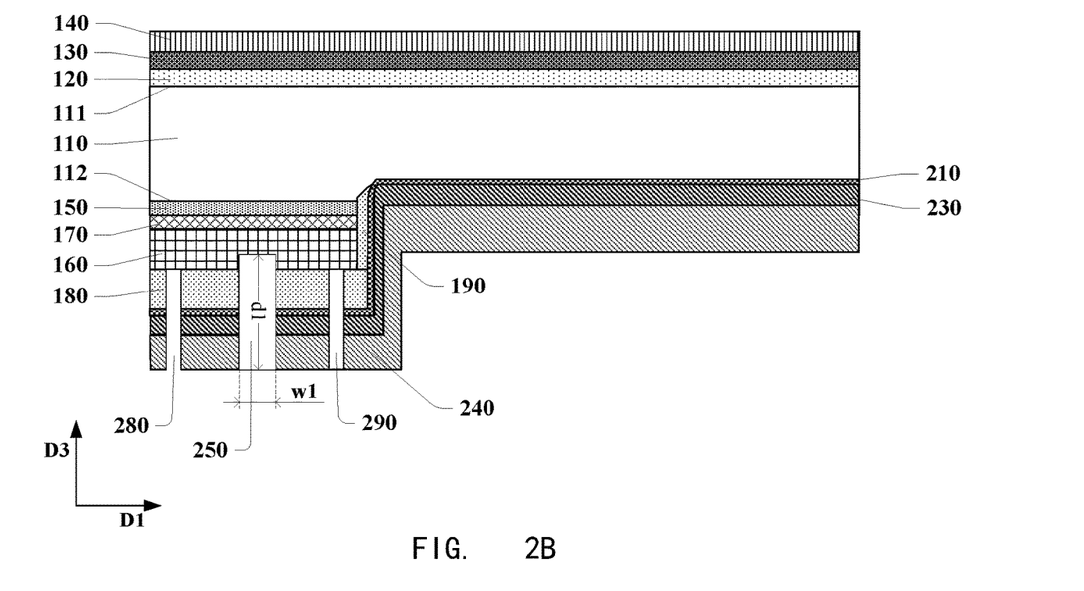

FIG. 2B is a schematic cross-sectional view of a solar cell intermediate according to an embodiment. Referring to FIG. 2B, the groove 250 has a depth d1 in the thickness direction D3 and a width w1 in the first direction D1. The width w1 can be any value in the range of 15 μm to 200 μm, such as 15 μm, 50 μm, 100 μm, 150 μm or 200 μm. The groove 250 goes deep into the first doped layer 160, and the depth of the portion of the groove 250 which is in the first doped layer 160 is not limited. For example, the depth of the portion of the groove 250 which is in the first doping layer 160 may be any percentage of 5%~95% of the thickness of the first doping layer 160, such as 5%, 25%, 35% or 95%, a smaller percentage is conducive to improving the electrical performance of the solar cell. The groove 250 may not go deep into the first doping layer 160 but go deep to the position of exposing the surface of the first doping layer 160 away from the substrate 110.

Referring to FIG. 1B and FIG. 2B, the first grid 260 is in an inverted "T" shape, and the first grid 260 has a first contact portion 261 and a second contact portion 262. The first contact portion 261 is located inside the groove 250, and the opposite side surfaces of the first contact portion 261 in the first direction D1 are respectively in contact with the opposite side walls of the groove 250, and the end of the first contact portion 261 close to the substrate 110 is in contact with the first doped layer 160 exposed by the groove 250. The second contact portion 262 is outside the groove 250, and the width w2 of the second contact portion 262 in the first direction D1 is larger than the width w1 of the groove 250. The second grid 270 is located on a surface of the first transparent conductive layer 240 at the second region 112b away from the substrate 110. In some embodiments, the second grid 270 may also go deep into the first transparent conductive layer 240. The materials of first grid 260 and the second grid 270 may be selected from silver and/or copper. Referring to FIG. 1B and FIG. 2A, the first grid 260 is located on the first surface 221 of the step structure, and the second grid 270 is located on the third surface 223 of the step structure; or in other words, the first grid 260 and the second grid 270 are respectively located at different step surfaces of the step structure, wherein the step surface where the second grid 270 located (that is, the third surface 233) is higher than the step surface where the first grid 260 is located (that is, the first surface 221) in the thickness direction D3. As mentioned above, the first grid 260 being located on the first surface 221 means that the first grid 260 goes deep to the interior of the step structure at the first surface 221.

Referring to FIG. 1B, the first grid 260 is in an inverted "T" shape. In other words, the size of the first contact portion 261 of the first grid 260 in the first direction D1 is smaller than that of the second contact portion 262. As shown in FIG. 2B, reducing the size of the first contact portion 261 in the first direction D1 is beneficial to reducing the width w1 of the groove 250, thereby reducing the cost of forming the groove 250. For example, when the groove 250 is etched by laser, the groove 250 with a smaller width w1 is beneficial to reducing the cost of laser grooving. In addition, the size of the second contact portion 262 in the first direction D1 is larger than the size of the first contact portion 261 in the first direction D1, which is beneficial to reducing the contact resistance between the first grid 260 and an external component.

In other embodiments, the first grid 260 may not be an inverted "T" shape, but a straight-line shape, that is, the size of the second contact portion 262 in the first direction D1 is the same as that of the first contact portion 261.

Referring to FIG. 1A, FIG. 1B and FIG. 2B, the first isolation trench 280 and the second isolation trench 290 are arranged in the first direction D1 at intervals, and the first isolation trench 280 and the second isolation trench 290 penetrate the first transparent conductive layer 240 corresponding to the first region 112a to separate the first transparent conductive layer 240, thereby realizing the electrical isolation of the first grid 260 and the second grid 270, and preventing the first transparent conductive layer 240 from connecting the first grid 260 and the second grid 270 which would cause short-circuit between adjacent grids of the solar cell. Specifically, referring to FIG. 1A, the first isolation trench 280 and the second isolation trench 290 extend in the second direction D2, the first isolation trench 280 electrically isolates the first grid 260 from the second grid on the left (not shown in FIG. 1A), and the second isolation trench 290 electrically isolates the first grid 260 from the second grid 270 on the right.

Next, referring to FIG. 2B, the first isolation trench 280 and the second isolation trench 290 penetrate the first transparent conductive layer 240 in the thickness direction D3. It should be understood that, in order to prevent the first transparent conductive layer 240 from electrically connecting the first grid 260 and the second grid 270, the length of the first isolation trench 280 and the second isolation trench 290 in the second direction D2 and the depth in the thickness direction D3 should meet the requirement of separating the first transparent conductive layer 240.

Referring to FIG. 2B, in some embodiments, the first isolation trench 280 and the second isolation trench 290 go deep into the surface of the first doped layer 160 away from the substrate 110. In other words, the first isolation trench 280 and the second isolation 290 expose the surface of the first doped layer 160 away from the substrate 110. As shown in FIG. 1G and FIG. 2B, the depth of the first isolation trench 280 and the second isolation trench 290 in FIG. 2B can also be described as, the first isolation trench 280 and the second isolation trench 290 both go deep into the second surface 342 of the first stack structure 340.

Figure 2C:
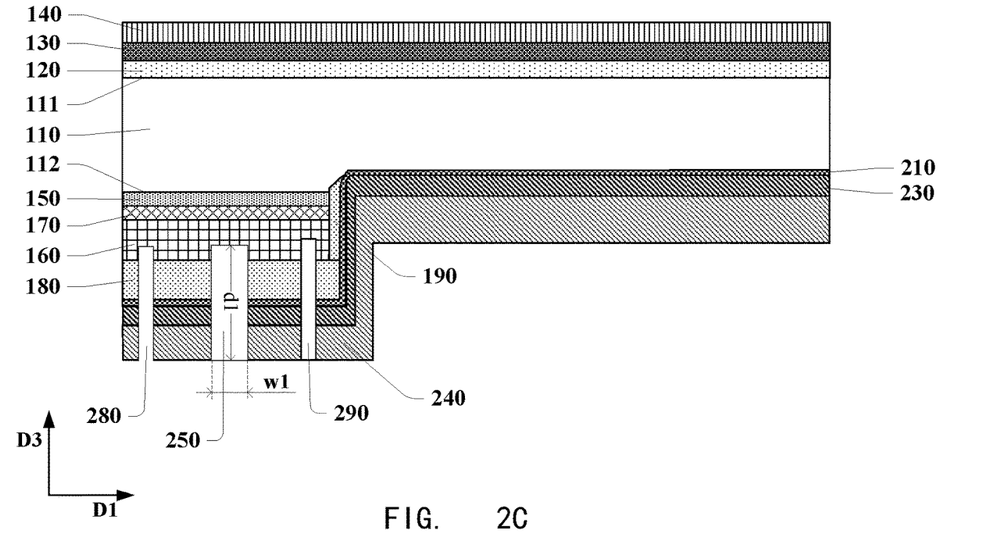

Referring to FIG. 2C, in other embodiments, the first isolation trench 280 and the second isolation trench 290 go deep into the first doped layer 160 in the thickness direction D3, and do not penetrate through the first doped layer 160. The depth of the first isolation trench 280 and the second isolation trench 290 into the first doped layer 160 may be different. For example, in FIG. 2C, the bottom surface of the second isolation trench 290 is closer to the substrate 110 than the first isolation trench 280.

In some embodiments, the first isolation trench 280 and the second isolation trench 290 do not penetrate the first insulating layer 180. In this way, the first isolation trench 280 and the second isolation trench 290 will not damage the second diffusion layer 150, the tunnel oxide layer 170, and the first doped layer 160, thereby avoiding the impact of the first isolation trench 280 and the second isolation trench 290 on the efficiency of the solar cell.

Figure 2D:
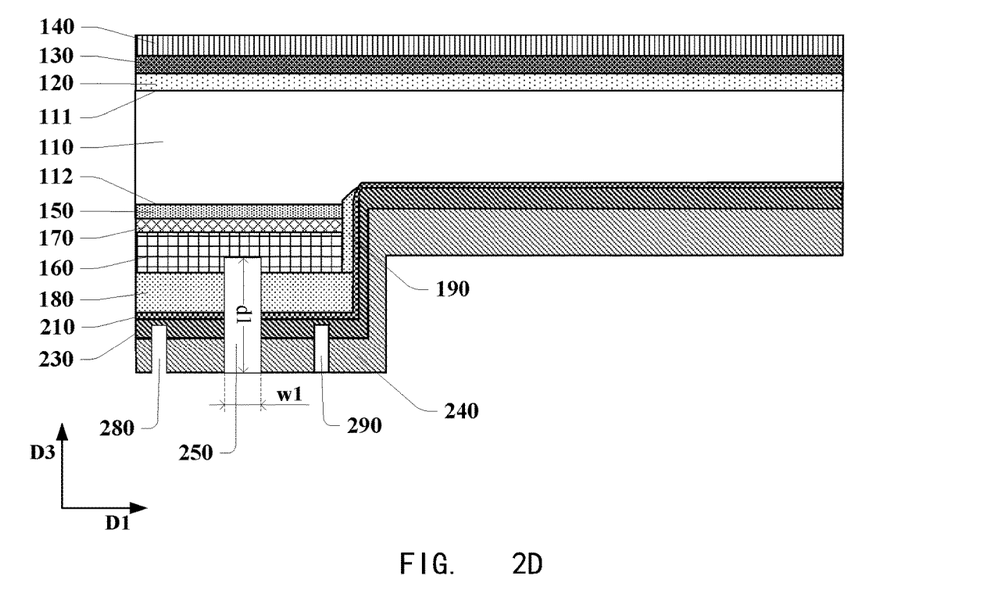

Referring to FIG. 2D, in other embodiments, the first isolation trench 280 may go deep to any position between the surface of the second doped layer 230 away from the substrate 110 and the surface of the second passivation layer 210 close to the substrate 110. Similarly, the second isolation trench 290 may also go deep to any position between the surface of the second doped layer 230 away from the substrate 110 and the surface of the second passivation layer 210 close to the substrate 110.

Figure 2E:
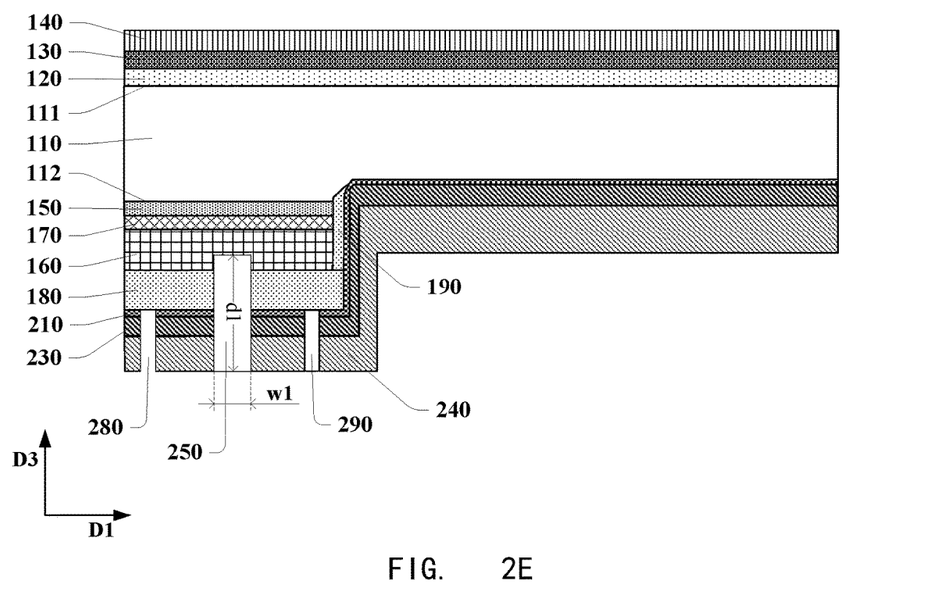

Referring to FIG. 2E, in some embodiments, the first isolation trench 280 may go deep to the surface of the first insulating layer 180 away from the substrate 110, and the first isolation trench 280 may also go deep to the interior of the first insulating layer 180. Similarly, the second isolation trench 290 may go deep to the surface of the first insulating layer 180 away from the substrate 110, and the second isolation trench 290 may also go deep to the interior of the first insulating layer 180.

The relationship between the first isolation trench 280 and the first doped layer 160 may be different from that between the second isolation trench 290 and the first doped layer 160. For example, the following situation may exist: (1) the bottom surface of the first isolation trench 280 is at the surface of the first doped layer 160 away from the substrate 110, and the bottom surface of the second isolation trench 290 is in the interior of the first doped layer 160; (2) the bottom surface of the first isolation trench 280 is in the interior of the first doped layer 160, and the bottom surface of the second isolation trench 290 is at the surface of the first doped layer 160 away from the substrate 110. In short, the first isolation trench 280 and the second isolation trench 290 can go deep to any position between the surface close to the substrate 110 of the first transparent conductive layer 240 and the surface close to the substrate 110 of the first doped layer 160, and the bottom surface of the first isolation trench 280 may substantially align with or not align with the bottom surface of the second isolation trench 290 at the first direction D1.

The positions of the first isolation trench 280 and the second isolation trench 290 in the first direction D1 are not limited to those shown in FIG. 2B. Referring to FIG. 1B and FIG. 2B concurrently, the first isolation trench 280 and the second isolation trench 290 may locate at any position of the first transparent conductive layer 240 corresponding to the first region 112a. For example, the distance between the first isolation trench 280 and the groove 250 in the first direction D1, and/or the distance between the second isolation trench 290 and the groove 250 in the first direction D1 can be increased or decreased based on FIG. 2B. Here, "the first transparent conductive layer 240 corresponding to the first region 112a" refers to the portion of the first transparent conductive layer 240 overlapping the first region 112a when projected in the thickness direction D3.

Referring to FIG. 1B and FIG. 2B, the sidewall of the groove 250 exposes the second passivation layer 210, the second doped layer 230, and the first transparent conductive layer 240. The sidewall of the first contact portion 261 is in contact with the exposed second passivation layer 210, the exposed second doped layer 230, and the exposed first transparent conductive layer 240. The first isolation trench 280 and the second isolation trench 290 separate the second passivation layer 210, the second doped layer 230, and the first transparent conductive layer 240, thereby preventing the first grid 260 from being electrically connected to the second grid 270.

Referring to FIG. 1H and FIG. 2B, in one embodiment, the opposite sides of the first contact portion 261 in the first direction D1 are not in contact with the sidewall of the groove 250, and the first contact portion 261. A gap 350 is formed between the sidewalls of groove 250 and the first contact portion 261. The gap 350 can ensure that the first grid 260 is not in contact with one or more layers of the second passivation layer 210, the second doped layer 230, and the first transparent conductive layer 240 which are exposed by the groove 250. For example, when the first isolation trench 280 and the second isolation trench 290 do not completely separate the second passivation layer 210, the second doped layer 230, and the first transparent conductive layer 240, the gap 350 can prevent electrical connection between the first grid 260 and the second grid 270, thereby avoiding short-circuit between the first grid 260 and the second grid 270. In some embodiments, an insulating layer can be provided in the gap 350, so it can be ensured that the first grid 260 does not contact the second passivation layer 210, the second doped layer 230, and the first transparent conductive layer which are exposed by the groove 250.

Referring to FIG. 1B and FIG. 2B, the first isolation trench 280 and the second isolation trench 290 separate the first transparent conductive layer 240 to realize electrical isolation of the first grid 260 and the second grid 270, thereby prevent the first transparent conductive layer 240 from connecting the first grid 260 with the second grid 270 which would cause a short-circuit between two adjacent electrodes of the solar cell. Specifically, as shown in FIG. 1A, the first isolation trench 280 and the second isolation trench 290 extend in the second direction D2, and the first isolation trench 280 electrically isolates the first grid 260 from the second grid on the left (not shown in the FIG. 1A), the second isolation trench 290 electrically isolates the first grid 260 from the second grid 270.

FIG. 1F is a partial cross-sectional schematic diagram of a partial solar cell 500 according to an embodiment. Referring to FIG. 1F and FIG. 2B, a second transparent conductive layer 310 may also be provided between the first contact portion 261 and the groove 250. In other words, a second transparent conductive layer 310 is formed between the bottom of the first contact portion 261 and the first doped layer 160, and formed between the first contact portion 261 and the sidewall of the groove 250 either.

As mentioned above, an entire solar cell includes several solar cell parts 100 arranged adjacently in the first direction D1, wherein the structure located at the left edge and right edge (in the first direction D1) of the entire solar cell is somewhat different from the partial solar cell in FIG. 1B, which is described below.

Figure 3A:
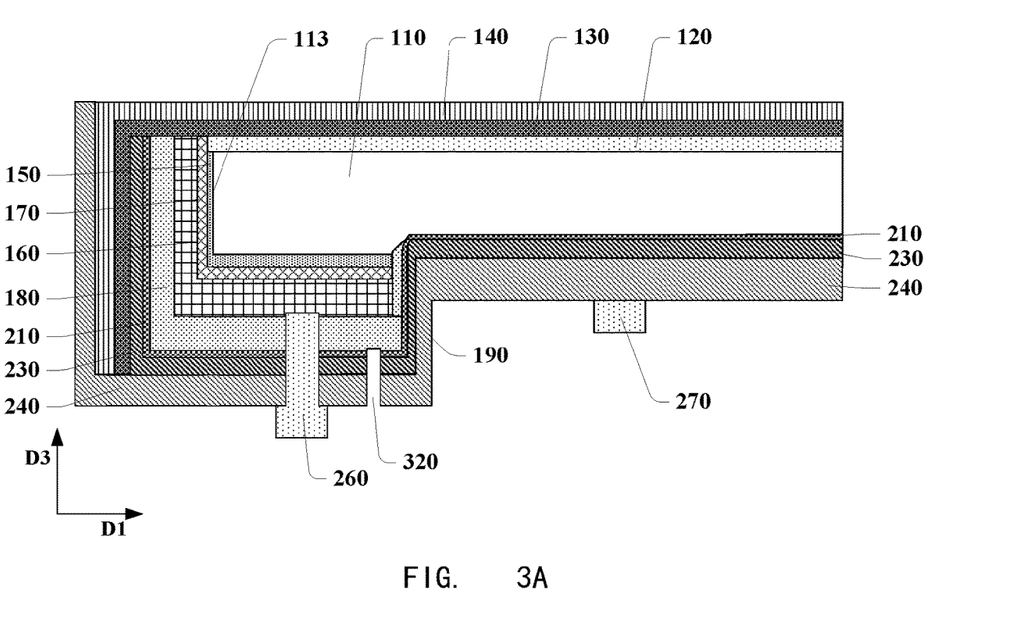
FIG. 3A is a schematic partial cross-sectional view of a solar cell according to an embodiment of the present application.
Figure 3B:
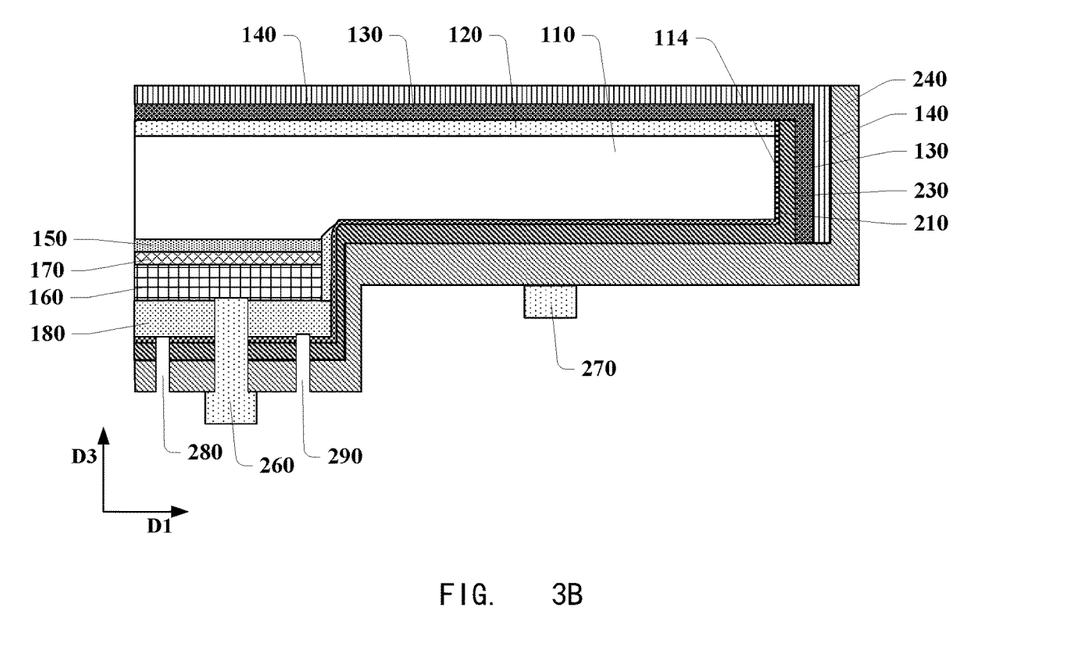
FIG. 3B is a partial cross-sectional schematic diagram of a solar cell according to another embodiment of the present application.

FIG. 3A is a partial cross-sectional schematic diagram of a solar cell according to an embodiment, and FIG. 3B is a partial cross-sectional schematic diagram of a solar cell according to another embodiment. The partial solar cell shown in FIG. 3A shows a cross-sectional schematic diagram of the leftmost portion of an entire solar cell, and the partial solar cell shown in FIG. 3B shows a cross-sectional schematic diagram of the rightmost portion of an entire solar cell.

Figure 4:
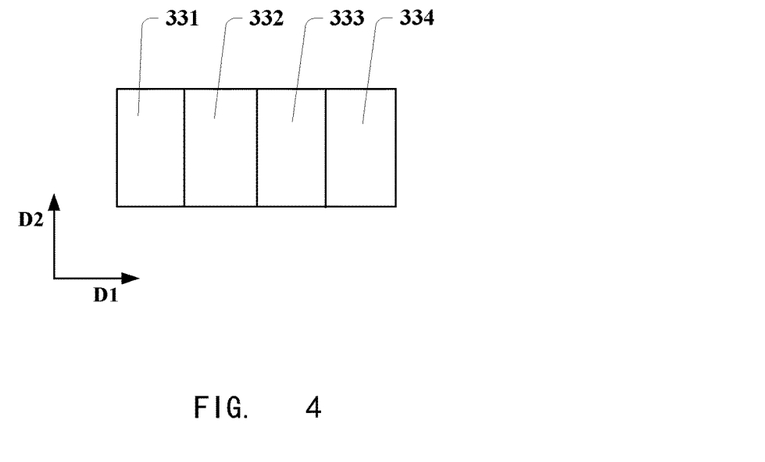
FIG. 4 is a schematic top view of an entire solar cell according to an embodiment of the present application.

In order to facilitate the understanding of the positional relationship among the solar cell structures shown in FIG. 1B, FIG. 3A, and FIG. 3B, the positional relationship of the solar cell structures in the above three figures is explained here through FIG. 4. FIG. 4 is a schematic top view of an entire solar cell according to an embodiment. Referring to FIG. 4, the first partial structure 331, the second partial structure 332, the third partial structure 333 and the fourth partial structure 334 are arranged adjacently in sequence in the first direction D1, wherein the first partial structure located on the leftmost 331 may be from the solar cell structure shown in FIG. 3A, the second partial structure 332 and the third partial structure 333 may be from the solar cell structure shown in FIG. 1B, and the fourth partial structure 334 on the most right may be from FIG. 3B. It should be noted that the number and distribution of partial structures in an entire solar cell are not limited to FIG. 4, and FIG. 4 is only used to illustrate the positional relationship among the solar cell structures shown in FIG. 1B, FIG. 3A and FIG. 3B.

Comparing FIG. 1B with FIG. 3A, the second diffusion layer 150 is also formed on the first side 113 of the substrate 110, and the second diffusion layer 150 formed on the first side 113 is in contact with the first diffusion layer 120 in the thickness direction D3 in FIG. 3A. The tunnel oxide layer 170, the first doped layer 160, and the first insulating layer 180 are also sequentially formed on the side of the second diffusion layer 150 away from the first side 113. In short, in FIG. 1B, the second diffusion layer 150, the tunneling oxide layer 170, the first doped layer 160, and the first insulating layer 180 are sequentially stacked in the first region 112a of the second surface 112 in the thickness direction D3. In FIG. 3A, the second diffusion layer 150, the tunnel oxide layer 170, the first doped layer 160, and the first insulating layer 180 are also sequentially stacked on the first side 113 in the first direction D1. The thicknesses of above-mentioned functional layers (second diffusion layer 150, tunnel oxide layer 170, first doped layer 160, and first insulating layer 180) located in the first region 112a may be the same as (or different from) those of above-mentioned functional layers located on the first side 113.

Next, in FIG. 1B, the second passivation layer 210 and the second doped layer 230 are sequentially formed on the first insulating layer 180 within the first region 112a and the second region 112b in the thickness direction D3.

In FIG. 3A, the second passivation layer 210 and the second doped layer 230 are also sequentially formed on the surface of the first insulating layer 180 located on the first side 113 in the thickness direction D3. The thicknesses of the second passivation layer 210 and the second doped layer 230 on the first side 113 can be equal to the thicknesses of the second passivation layer 210 and the second doped layer 230 on the second surface 112 respectively, or they can be different.

Compared with the first passivation layer 130 and the anti-reflection layer 140 in FIG. 1B, the first passivation layer 130 and the anti-reflection layer 140 in FIG. 3A are also sequentially formed on a side of the second doped layer 230 corresponding to the first side 113, wherein the side is away from the substrate 110 in the first direction D1. The thicknesses of the first passivation layer 130 and the anti-reflection layer 140 on the first side 113 may be equal to or unequal to the thicknesses of the first passivation layer 130 and the anti-reflection layer 140 on the first surface 111.

In addition, as shown in FIG. 3A, the tunnel oxide layer 170, the first doped layer 160, the first insulating layer 180, the second passivation layer 210 and the second doped layer 230 are all in contact with the side of the first passivation layer 130 facing the substrate 110 in the thickness direction D3. In other words, the tunnel oxide layer 170, the first doped layer 160, the first insulating layer 180, the second passivation layer 210 and the second doped layer 230 terminate at the first passivation layer 130 in the thickness direction D3.

Continuing to compare FIG. 1B and FIG. 3A, there is no isolation trench on the left side of the first grid 260 in FIG. 3A, and a third isolation trench 320 is formed on the right side of the first grid 260. This is because the second grid 270 is located on the right side of the first grid 260, and there is no second grid 270 on the left side of the first grid 260, so the isolation trench may not be arranged on the left side of the first grid 260. For detailed descriptions about the third isolation trench 320, refer to the above descriptions of the first isolation trench and the second isolation trench, which will not be elaborated here.

Comparing FIG. 1B with FIG. 3B, the second passivation layer 210, the second doped layer 230, the first passivation layer 130, the antireflection layer 140, and the first transparent conductive layer 240 are also sequentially formed on the second side surface 114 of the substrate 110 in the first direction D1 in FIG. 3B. Here, the second passivation layer 210 and the second doped layer 230 located on the second side 114 are in contact with the side of the first passivation layer 130 facing the substrate 110 in the thickness direction D3. The first passivation layer 210 and the antireflection layer 140 located on the second side 114 are in contact with the side of the first transparent conductive layer 240 facing the substrate 110 in the thickness direction D3.

Referring to FIG. 3A and FIG. 3B, the thickness of each layer on the left and right sides of the entire solar cell may be equal to or different from the thickness of each layer on the front and/or back of the entire solar cell. For example, referring to FIG. 3A and FIG. 3B, the anti-reflection layer 140 is formed on the front side (the light-receiving side), the left side (the first side 113) and the right side (the second side 114) of the solar cell. The following three thicknesses may be equal or not equal: the thickness of the portion of the anti-reflection layer 140 corresponding to the front side, the thickness of the portion corresponding to the first side 113 and the thickness of the portion corresponding to the second side 114.

The basic concepts have been described above. Obviously, for those skilled in the art, the above disclosure is only an example and does not constitute a limitation to the present application. Although not expressly stated here, various modifications, improvements and amendments to this application may be made by those skilled in the art. Such modifications, improvements, and amendments are suggested in this application, so such modifications, improvements, and amendments still belong to the spirit and scope of the exemplary embodiments of this application.

Meanwhile, the present application uses specific words to describe the embodiments of the present application. For example, "one embodiment", "an embodiment", and/or "some embodiments" refer to a certain feature, structure or characteristic related to at least one embodiment of the present application. Therefore, it should be emphasized and noted that two or more references to "an embodiment" or "an embodiment" or "an alternative embodiment" in different places in this specification do not necessarily refer to the same embodiment. In addition, certain features, structures, or characteristics of one or more embodiments of the present application may be properly combined.

In some embodiments, numbers describing the quantity of components and attributes are used. It should be understood that such numbers used in the description of the embodiments use the modifiers "about", "approximately" or "substantially" in some examples. grooming. Unless otherwise stated, "about", "approximately" or "substantially" indicates that the stated figure allows for a variation of ±20%. Accordingly, in some embodiments, the numerical parameters used in the specification and claims are approximations that can vary depending upon the desired characteristics of individual embodiments. In some embodiments, numerical parameters should take into account the specified significant digits and adopt the general digit reservation method. Although the numerical ranges and parameters used in some embodiments of the present application to confirm the breadth of the scope are approximate values, in specific embodiments, such numerical values are set as precisely as practicable.

The invention claimed is:
1. A solar cell, comprising:
a substrate having a first surface and a second surface opposite to each other, the second surface having a first region and a second region adjacent in a first direction;
a first passivation layer located on the first surface;
a first doped layer and a tunnel oxide layer sequentially stacked in the first region;
a first insulating layer located on a surface of the first doped layer away from the substrate;
a second passivation layer located in the second region and extending to a surface of the first insulating layer away from the substrate;
a second doped layer located on a surface of the second passivation layer away from the substrate; and
a second insulating layer located between the second passivation layer and the first doped layer, and between the second passivation layer and the tunnel oxide layer in the first direction, wherein a side of the second insulating layer away from the substrate is in contact with the first insulating layer.

2. The solar cell of claim 1, further comprising a first transparent conductive layer located on a surface of the second doped layer away from the substrate.

3. The solar cell of claim 2, further comprising a first isolation trench and a second isolation trench arranged at intervals in the first direction, and penetrating the first transparent conductive layer corresponding to the first region.

4. The solar cell of claim 3, further comprising a first grid and a second grid, wherein the first grid penetrates the first insulating layer and is in contact with the first doped layer, the second grid is in contact with the first transparent conductive layer within the second region, and wherein the first isolation trench and the second isolation trench are distributed on both sides of the first grid in the first direction respectively.

5. The solar cell of claim 3, wherein the first isolation trench is deep into a surface of the first doped layer away from the substrate, and/or the second isolation trench is deep into the surface of the first doped layer away from the substrate.

6. The solar cell of claim 3, wherein the first isolation trench is deep into the first doped layer without penetrating the first doped layer, and/or the second isolation trench is deep into the first doped layer without penetrating the first doped layer.

7. The solar cell of claim 1, wherein the first insulating layer and/or the second insulating layer comprises one or more of silicon oxide, silicon nitride and silicon oxynitride.

8. The solar of claim 1, wherein there is a height difference between the first region and the second region in a thickness direction of the substrate.

9. The solar cell of claim 1, further comprising a first diffusion layer located on the first surface, wherein the first passivation layer is located on a surface of the first diffusion layer away from the substrate.

10. The solar cell of claim 1, further comprising a second diffusion layer arranged in the first region, wherein the first doped layer and the tunnel oxide layer are sequentially stacked on a surface of the second diffusion layer away from the substrate.

* * * * *